(12) United States Patent
Bhogavilli et al.

(10) Patent No.: US 8,175,098 B2
(45) Date of Patent: May 8, 2012

(54) METHOD FOR OPTIMIZING A ROUTE CACHE

(75) Inventors: Suresh Kumar Bhogavilli, Gaithersburg, MD (US); Glen Stuart Wiley, Goochland, VA (US)

(73) Assignee: Verisign, Inc., Reston, VA (US)

( * ) Notice: Subject to any disclaimer, the term of this patent is extended or adjusted under 35 U.S.C. 154(b) by 329 days.

(21) Appl. No.: 12/548,564

(22) Filed: Aug. 27, 2009

(65) Prior Publication Data

US 2011/0051728 A1  Mar. 3, 2011

(51) Int. Cl.
*H04L 12/28* (2006.01)
(52) U.S. Cl. ........................... 370/392; 370/412
(58) Field of Classification Search ............ 370/328, 370/338, 392
See application file for complete search history.

(56) References Cited

U.S. PATENT DOCUMENTS

| | | | |
|---|---|---|---|
| 6,661,803 B1 | 12/2003 | Choi et al. | |
| 7,280,999 B2 | 10/2007 | Chung et al. | |
| 7,310,686 B2 | 12/2007 | Uysal | |
| 7,546,368 B2 | 6/2009 | Drees et al. | |
| 7,631,101 B2 | 12/2009 | Sullivan et al. | |
| 7,685,270 B1 | 3/2010 | Vermeulen et al. | |
| 7,694,016 B2 | 4/2010 | Halley | |
| 7,725,602 B2 | 5/2010 | Liu et al. | |
| 7,734,815 B2 | 6/2010 | Leighton et al. | |
| 7,761,570 B1 | 7/2010 | Halley | |
| 7,769,826 B2 | 8/2010 | Gustafsson | |
| 7,814,202 B2 | 10/2010 | Drees et al. | |
| 7,925,747 B2 | 4/2011 | Kirwan et al. | |
| 7,925,782 B2 | 4/2011 | Sivasubramanian et al. | |
| 7,930,393 B1 | 4/2011 | Baumback et al. | |
| 7,933,951 B2 | 4/2011 | Sullivan et al. | |
| 2003/0084057 A1 | 5/2003 | Balogh | |
| 2003/0084074 A1 | 5/2003 | Balogh et al. | |
| 2003/0084075 A1 | 5/2003 | Balogh et al. | |
| 2004/0039798 A1 | 2/2004 | Hotz et al. | |
| 2004/0225750 A1* | 11/2004 | Lim et al. .................. 709/245 |
| 2004/0250127 A1 | 12/2004 | Scoredos et al. | |
| 2004/0254926 A1 | 12/2004 | Balogh | |
| 2005/0027882 A1 | 2/2005 | Sullivan et al. | |
| 2005/0050223 A1 | 3/2005 | Roeder et al. | |
| 2005/0105513 A1 | 5/2005 | Sullivan et al. | |
| 2007/0070820 A1 | 3/2007 | Gallant | |
| 2007/0100808 A1 | 5/2007 | Balogh | |

(Continued)

OTHER PUBLICATIONS

International Search Report and Written Opinions corresponding to PCT/US2010/046741 application.

*Primary Examiner* — Jung Park
(74) *Attorney, Agent, or Firm* — Finnegan, Henderson, Farabow, Garrett & Dunner, L.L.P.

(57) ABSTRACT

A system and method for managing a route cache to reduce the risk of disruption from denial of service attacks. All traffic arriving on a front interface from local (on-link) nodes (e.g., neighbor nodes) can be treated normally. However, for packets arriving from remote (off-link) sources addressed to a given destination IP address, a single, shared route cache entry can be used. The source-address field in this entry can be zeroed-out since it will not be used for traffic coming from any one source. Similarly, for all packets going to off-link destinations through the front-interface, another single shared route cache entry can be created and used. The destination-address field in this entry can be zeroed out since it will not be used for traffic going to any one destination.

27 Claims, 11 Drawing Sheets

U.S. PATENT DOCUMENTS

| | | |
|---|---|---|
| 2007/0204330 A1 | 8/2007 | Townsley et al. |
| 2007/0294419 A1 | 12/2007 | Ulevitch |
| 2008/0059152 A1 | 3/2008 | Fridman et al. |
| 2008/0071909 A1 | 3/2008 | Young et al. |
| 2008/0133729 A1 | 6/2008 | Fridman et al. |
| 2008/0155254 A1 | 6/2008 | Stradling |
| 2008/0201413 A1 | 8/2008 | Sullivan et al. |
| 2009/0106211 A1 | 4/2009 | Balogh |
| 2009/0106390 A1 | 4/2009 | Kirwan, Jr. et al. |
| 2009/0157889 A1 | 6/2009 | Treuhaft |
| 2009/0235359 A1 | 9/2009 | Abdulhayoglu et al. |
| 2009/0282027 A1 | 11/2009 | Subotin et al. |
| 2009/0282028 A1 | 11/2009 | Subotin et al. |
| 2009/0282038 A1 | 11/2009 | Subotin et al. |
| 2010/0030897 A1 | 2/2010 | Stradling |
| 2010/0077462 A1 | 3/2010 | Joffe et al. |
| 2010/0138559 A1 | 6/2010 | Sullivan et al. |
| 2010/0218040 A1 | 8/2010 | Bodmer et al. |
| 2010/0257266 A1 | 10/2010 | Holmes et al. |
| 2010/0274836 A1 | 10/2010 | Orentas et al. |
| 2010/0274970 A1 | 10/2010 | Treuhaft et al. |
| 2010/0287532 A1 | 11/2010 | Smith et al. |
| 2010/0318858 A1 | 12/2010 | Essawi et al. |
| 2011/0022678 A1 | 1/2011 | Smith et al. |
| 2011/0029662 A1 | 2/2011 | Drees et al. |
| 2011/0035469 A1 | 2/2011 | Smith et al. |
| 2011/0035497 A1 | 2/2011 | Daly et al. |
| 2011/0047292 A1 | 2/2011 | Gould et al. |
| 2011/0051728 A1 | 3/2011 | Bhogavilli et al. |
| 2011/0106891 A1 | 5/2011 | Gallant et al. |
| 2011/0110267 A1 | 5/2011 | Gallant |
| 2011/0161289 A1 | 6/2011 | Pei et al. |

* cited by examiner

FIG 4

| Entry ID | Source Address | Destination Address | Src. Interface | Dest. Interface |
|---|---|---|---|---|
| 1 | 192.168.10.99 | 71.191.32.20 | 0 | 1 |
| 2 | 71.191.32.20 | 192.168.10.99 | 1 | 0 |
| 3 | 192.168.10.99 | 192.168.10.77 | 0 | 1 |
| 4 | 192.168.10.77 | 192.168.10.99 | 1 | 0 |
| 5 | 192.168.10.99 | 192.168.10.55 | 0 | 1 |
| 6 | 192.168.10.55 | 192.168.10.99 | 1 | 0 |
| 7 | 192.168.10.99 | 193.212.1.11 | 0 | 1 |
| 8 | 193.212.1.11 | 192.168.10.99 | 1 | 0 |
| 9 | 192.168.10.99 | 74.125.67.100 | 0 | 1 |
| 10 | 74.125.67.100 | 192.168.10.99 | 1 | 0 |

PRIOR ART

FIG 5

| Entry ID | Source Address | Destination Address | Src. Interface | Dest. Interface |
|---|---|---|---|---|
| 1 | 192.168.10.99 | 0.0.0.0 | 0 | 1 |
| 2 | 0.0.0.0 | 192.168.10.99 | 1 | 0 |
| 3 | 192.168.10.99 | 192.168.10.77 | 0 | 1 |
| 4 | 192.168.10.77 | 192.168.10.99 | 1 | 0 |
| 5 | 192.168.10.99 | 192.168.10.55 | 0 | 1 |
| 6 | 192.168.10.55 | 192.168.10.99 | 1 | 0 |

FIG 6

| Entry ID | Source Address | Destination Address | Src. Interface | Dest. Interface |
|---|---|---|---|---|
| 1 | 0.0.0.0 | 0.0.0.0 | 1 | 2 |
| 2 | 0.0.0.0 | 0.0.0.0 | 2 | 1 |
| 3 | 192.168.10.1 | 192.168.10.99 | 0 | 1 |
| 4 | 192.168.10.99 | 192.168.10.1 | 1 | 0 |
| 5 | 192.168.10.1 | 192.168.10.77 | 0 | 1 |
| 6 | 192.168.10.77 | 192.168.10.1 | 1 | 0 |
| 7 | 192.168.10.1 | 192.168.10.55 | 0 | 1 |
| 8 | 192.168.10.55 | 192.168.10.1 | 1 | 0 |

1150 → (Entry 1)
1160 → (Entry 2)

METHOD FOR OPTIMIZING A ROUTE CACHE

BACKGROUND OF THE INVENTION

The present invention relates generally to methods for preventing attacks on a server which operate by flooding the server route-cache with a vast number of entries.

When sending packets of data over an Internet Protocol (IP) network, the routes to be taken by different packets are often added to a database called Forwarding Information Base (FIB). A FIB is also referred to as a routing table. The routing table specifies how to properly forward packets so that they reach their correct destinations. Some operating systems, including Linux, support multiple FIBs. Some FIBs can be associated with different network interfaces. A FIB-rules-database contains rules that specify which FIB should be used when processing a given IP packet. When processing an incoming, outgoing, or forwarded packet, an operating system not only has to track which FIB should be used, but also determine what route should be used, what sequence of functions should process the packets, to which neighbor the packet should be sent, and more. The operating system also performs several validations on the source and destination IP addresses of the packets to thwart denial of service attacks. To improve packet handling performance, it is common to maintain several caches that track recently seen flows of packets and how they are processed. This helps apportion the high costs of per-packet validations and internal packet handling paths across a potentially large number of packets that belong to a flow. For caching purposes, a flow can be packets with the same IP source address, IP destination address, incoming/outgoing interface, and the Type-of-Service (ToS) marking.

The Linux IP stack uses three different caches: a route-cache, a neighbor-cache, and a hardware-header-cache. They are all specializations of a generic destination-cache. The destination-cache holds information about destination addresses and functions in a form that is protocol independent. The neighbor-cache holds the mapping between the IP address and the MAC address of all neighbors of a given node. A neighbor (also known as an "on-link" node) to a given node is one that can be locally reached from the given node, e.g., over Ethernet links. A node that may not be locally reached from a given node can be known as an "off-link" node with respect to the given node. The neighbor cache is also referred to as the Address Resolution Protocol (ARP) table for IPv4 protocol. The hardware-header-cache holds the MAC layer header and the functions used to manipulate those headers. The route-cache holds information about the characteristics of the IP packets, the functions used to handle them, and information about the neighbor that should receive the matching packets.

A route-cache is commonly implemented as a hash table that is initialized at the machine boot time. The number of hash buckets is computed automatically at boot time based on the amount of memory in the system. The maximum number of entries that the route cache can store is controllable by operating system parameters.

There is usually one route cache entry created for each unique combination of IPv4 source and destination addresses across all the packets handled by the IPv4 stack. This can be used as an attack vector. An attacker can send packets to the victim using random source addresses. The attacker does not even have to receive any response. As the victim handles the packets, it keeps populating the route cache with entries it hopes to reuse, but since the source addresses used in the attack are unique, it never does reuse them. Within a few hundred thousand packets, the route cache in the victim can fill up, and performance can drop significantly.

Embodiments of the present invention can remove this attack vector by making changes to the way the route cache is used.

SUMMARY OF THE INVENTION

An embodiment of the invention can change the procedure for managing the route cache. At least one network interface can be identified as the "front interface." All traffic arriving on this front interface from local (on-link) nodes (e.g., neighbor nodes) can be treated normally. Processing such an on-link packet can result in a unique route cache entry with a local destination address. However, for packets arriving from remote (off-link) sources addressed to a given destination IP address, a single, shared route cache entry can be used. The source-address field in this entry can be zeroed-out since it will not be used for traffic coming from any one source. Similarly, for all packets going to off-link destinations through the front-interface, another single shared route cache entry can be created and used. The destination-address field in this entry is zeroed out since it will not be used for traffic going to any one destination.

All packets going from the server to off-link destinations may go through a single router. As the router address is generally the only information needed from the route cache when sending packets to off-link destinations, a single route cache entry can be used for all traffic going to off-link destinations. This is also the case when router-redundancy is implemented using certain protocols that make a group of routers appear as a single router to the node, including Virtual Router Redundancy Protocol (VRRP) or Cisco Host Standby Router Protocol (HSRP). When multiple routers are used, for redundancy or otherwise, it is still possible to use the route cache optimization, but it may be necessary to use more than two shared entries or to embed additional information in the shared entries.

Similarly, as all traffic coming from off-link sources generally relies on the same information from the route cache, a single cache entry can be used for all incoming traffic from off-link sources.

As a request from a new remote IP address will no longer lead to the creation of a new entry in the route-cache, this prevents flooding of the route-cache when a server receives requests from large numbers of source IP addresses, whether such requests are legitimate or spoofed.

These and other advantages and features will be more readily understood from the following detailed description of embodiments of the invention that is provided in connection with the accompanying drawings.

BRIEF DESCRIPTION OF THE DRAWINGS

Referring to the exemplary drawings wherein like elements are numbered alike in the accompanying Figures:

FIG. 4 shows an extract from a route cache on a network node implementing a normal route cache.

FIG. 5 shows an extract from a route cache on a network node implementing an embodiment of the invention to optimize the route cache.

FIG. 6 shows an extract from a route cache on a router implementing an embodiment of the invention to optimize the route cache.

DETAILED DESCRIPTION OF THE INVENTION

Embodiments of the present invention relate to a method for managing a route-cache on a server (711) or router (771) which prevents the route-cache (110) from being flooded with entries when a large number of network packets are sent to the server from a large number of off-link network nodes with different IP addresses.

Figure 1:
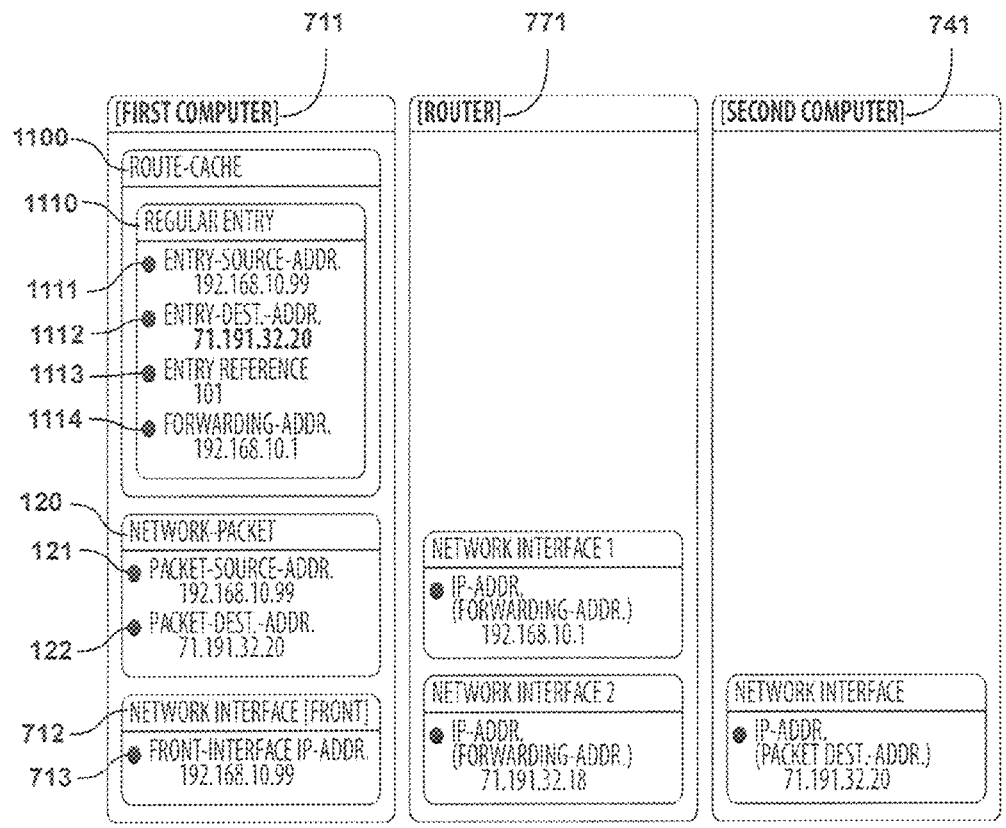
FIG. 1 depicts two network nodes communicating via a router, showing the relevant entry in the route cache on the first computer, implementing a normal route cache.
Figure 2:
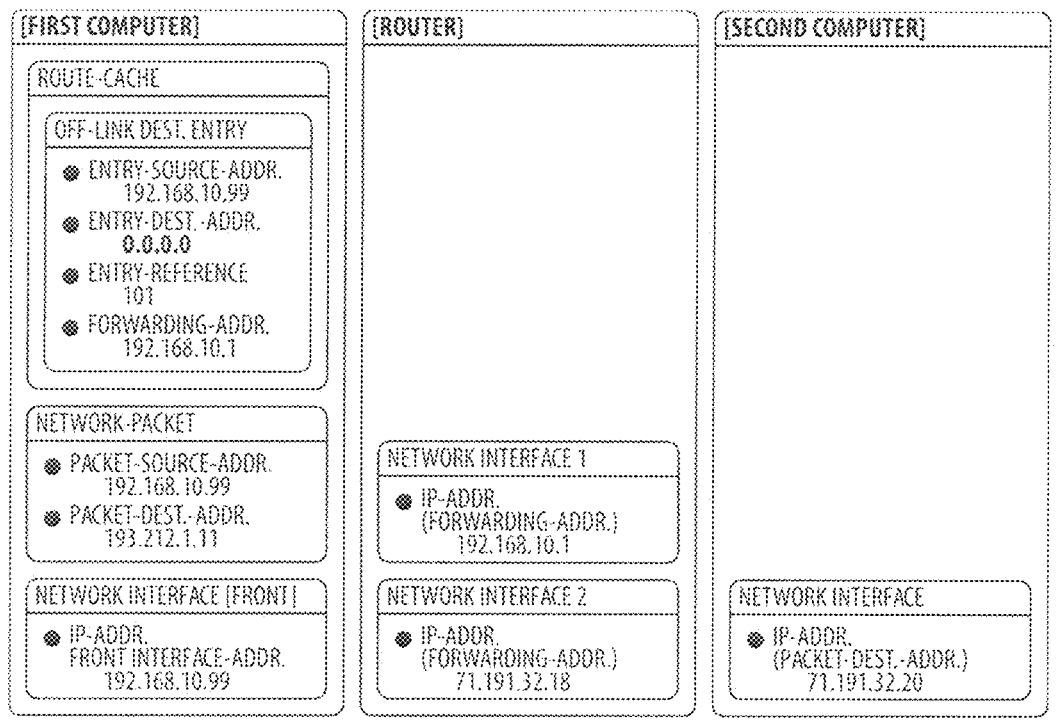
FIG. 2 depicts two network nodes communicating via a router, showing the relevant entry in the route cache on the first computer, implementing an embodiment of the invention to optimize the route cache.
Figure 3:
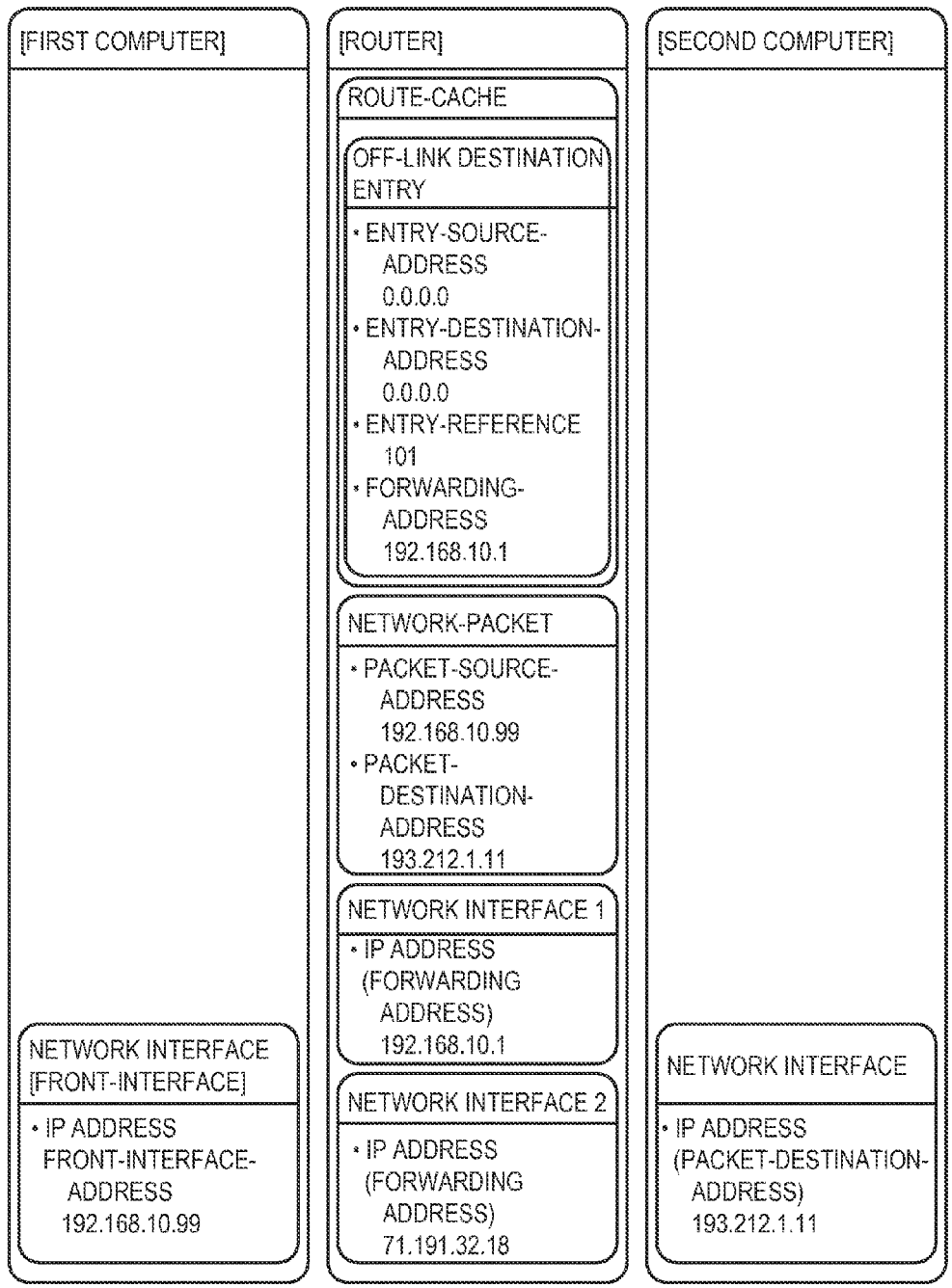
FIG. 3 depicts two network nodes communicating via a router, showing the relevant entry in the route cache on the router, implementing an embodiment of the invention to optimize the route cache.
Figure 7:
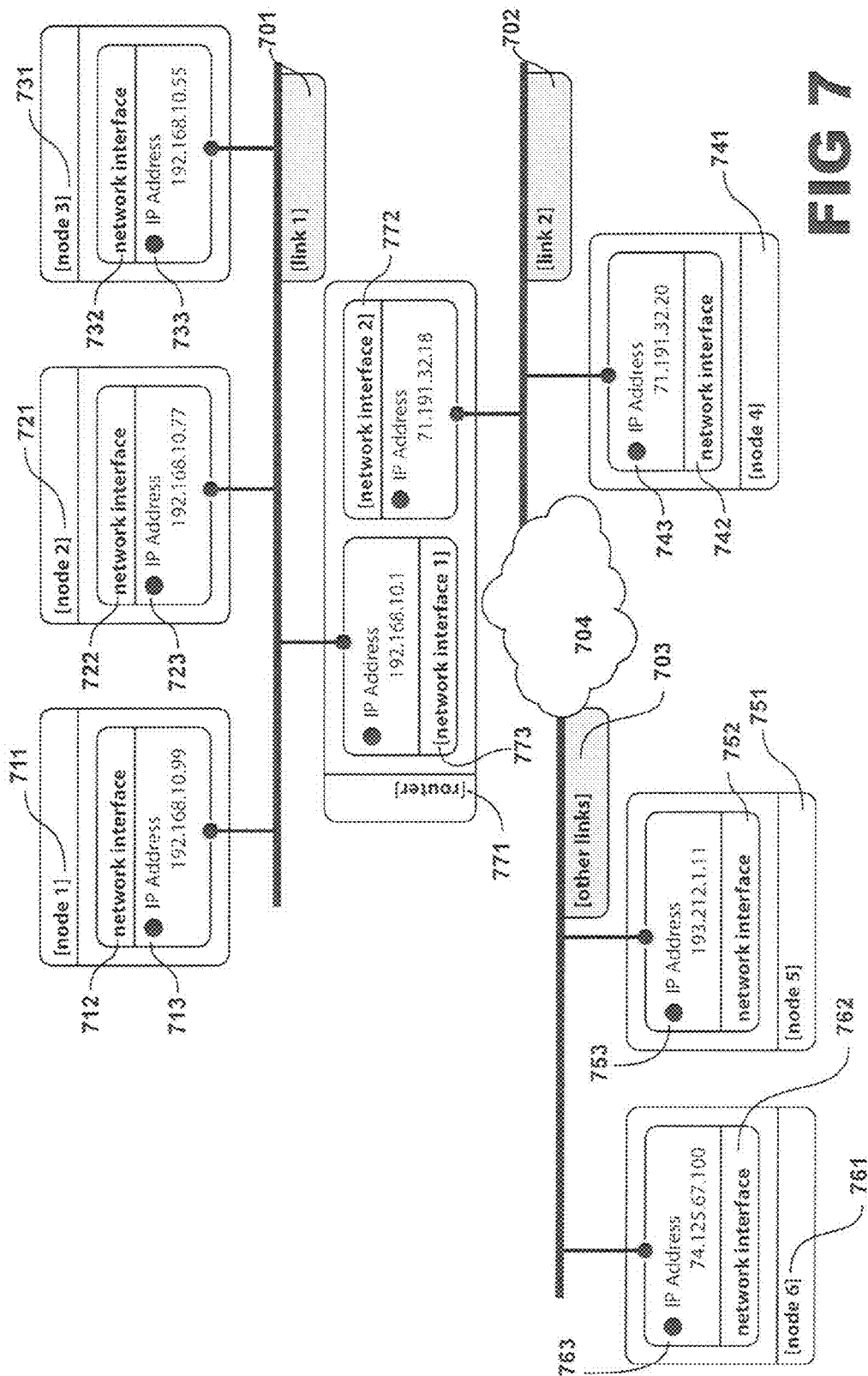
FIG. 7 shows a number of network nodes connected via a number of different links. Nodes 1, 2 and 3 and Network Interface 1 of the router are all connected to the same link, and are accordingly all on-link nodes from each others' perspective.
Figure 8:
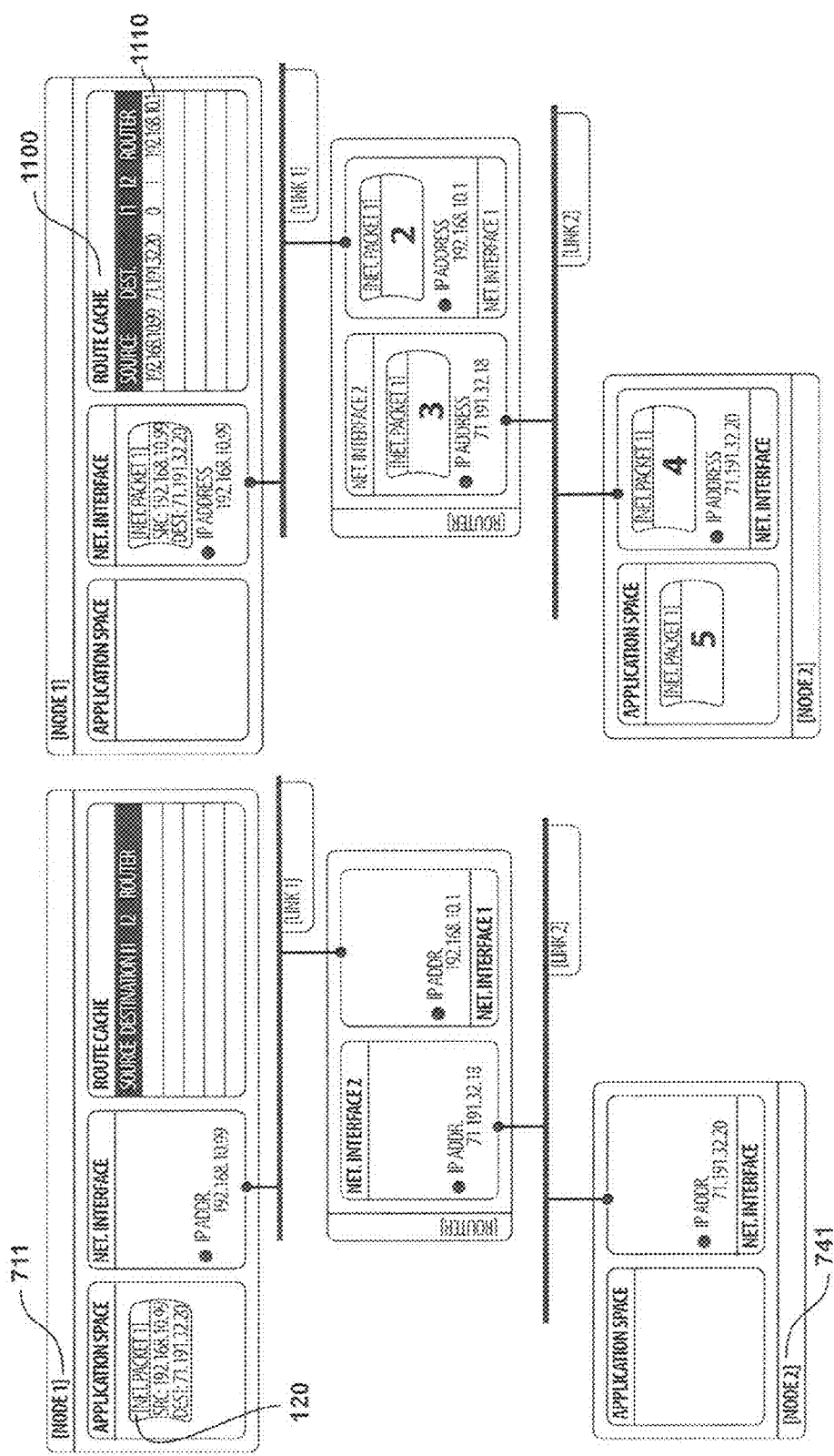
FIG. 8 shows a packet being sent from node 1 to node 2 via a router, and the route cache entries relevant to the packet at node 1. No nodes are implementing the invention. The route cache entries are shown as they are created.
Figure 9:
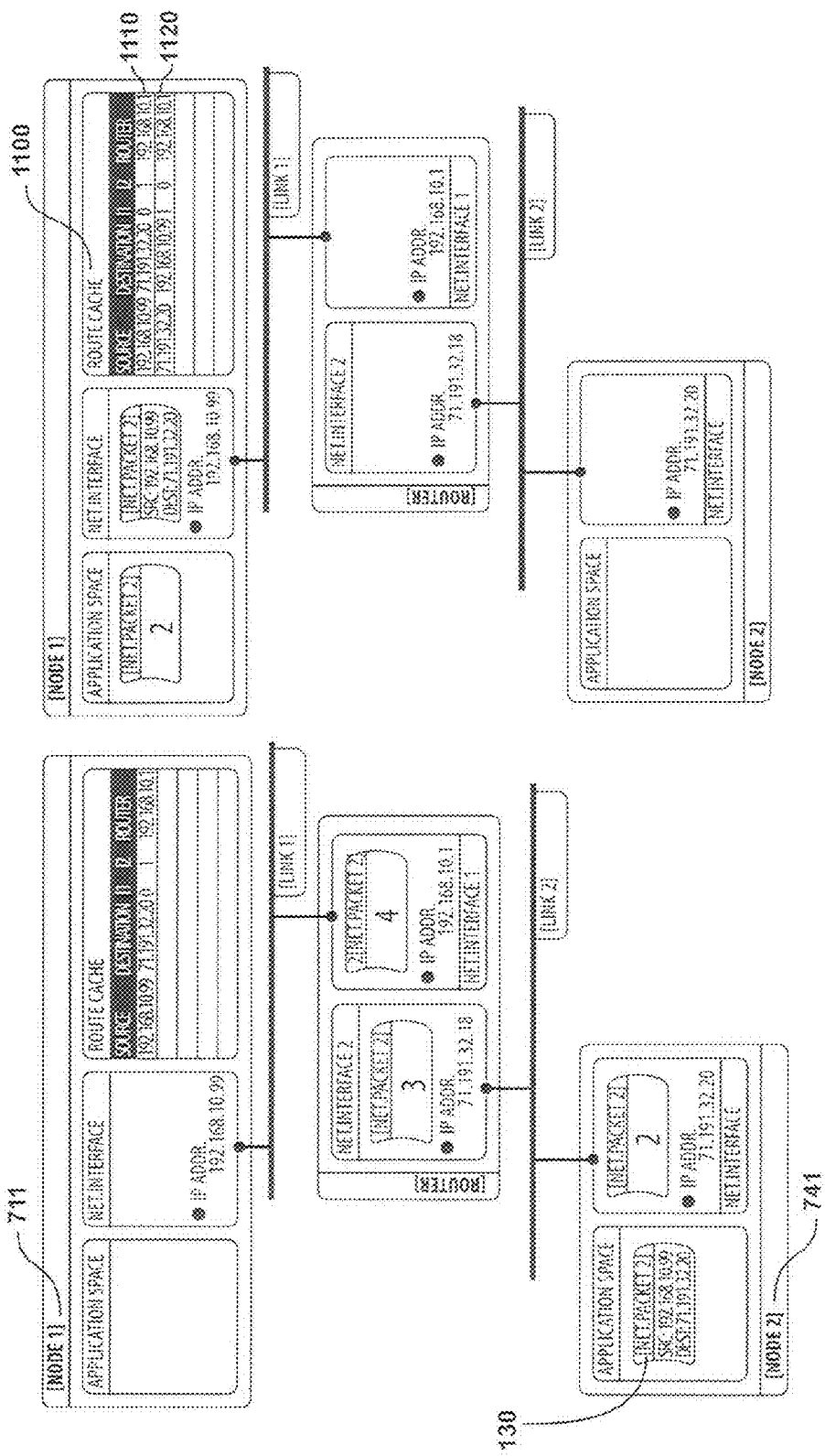
FIG. 9 shows a packet being sent from node 2 to node 1 via a router, and the route cache entries relevant to the packet at node 1. No nodes are implementing the invention. The route cache entries are shown as they are created.
Figure 10:
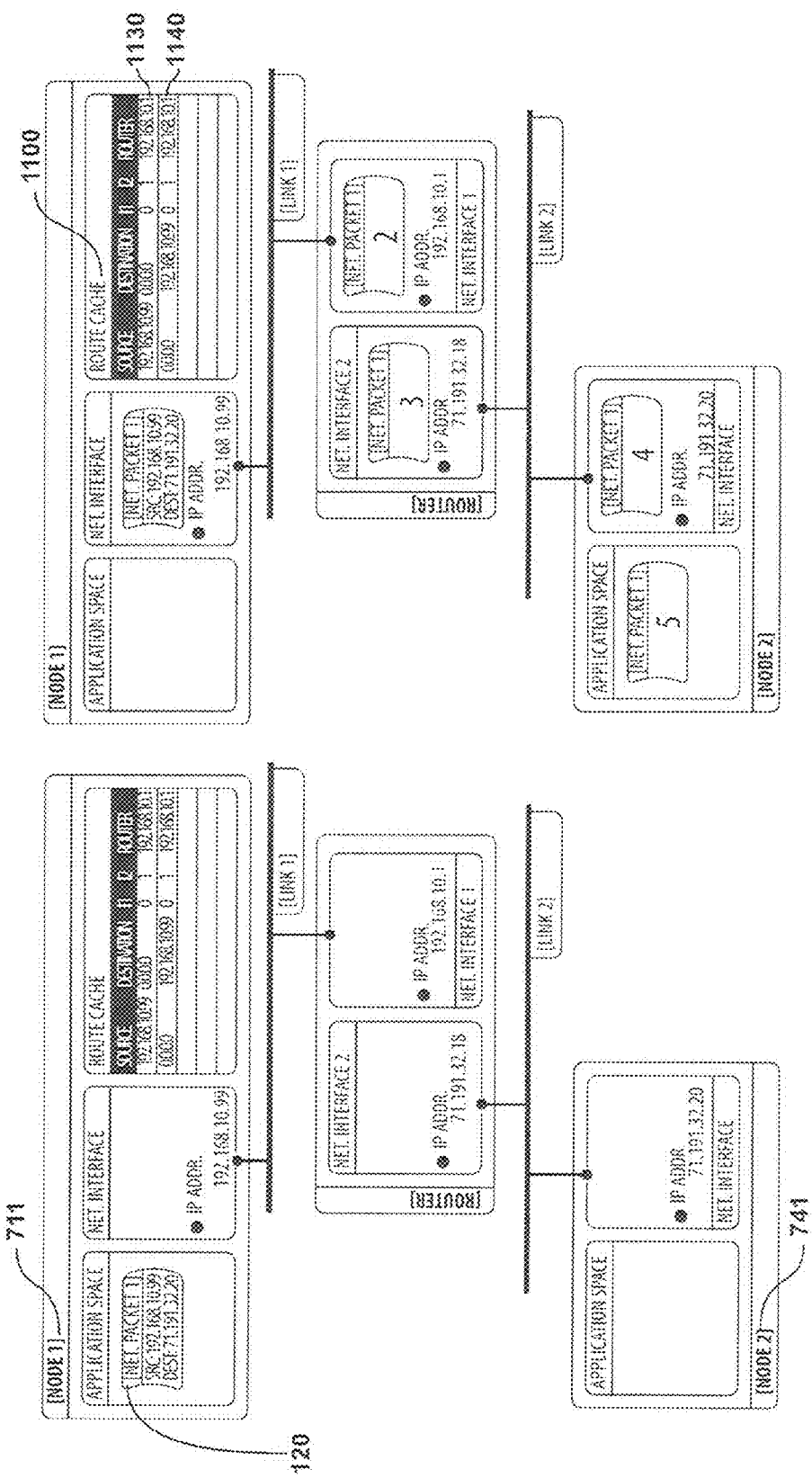
FIG. 10 shows a packet being sent from node 1 to node 2 via a router, and the route cache entries relevant to the packet at node 1. Node 1 is implementing an embodiment of the invention. As no route cache entries are created as a result of the packet transmission, only the shared entries are relevant and shown.
Figure 11:
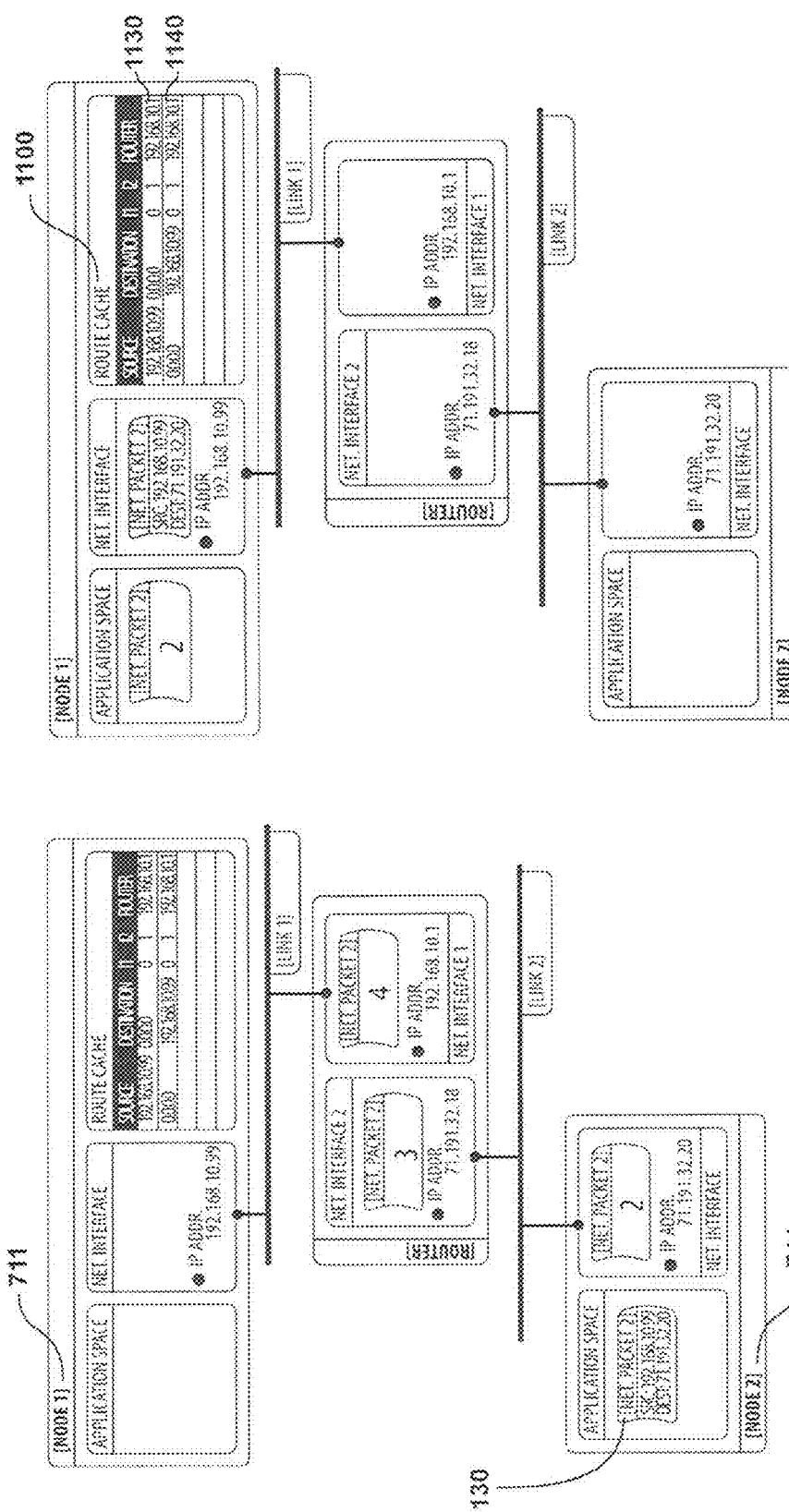
FIG. 11 shows a packet being sent from node 2 to node 1 via a router, and the route cache entries relevant to the packet at node 1. Node 1 is implementing an embodiment of the invention. As no route cache entries are created as a result of the packet transmission, only the shared entries are relevant and shown.

In one embodiment of the invention, a server (711) is connected to an Ethernet link (701) with at least one physical network interface (712). This Ethernet link may be connected to a number of nodes, including other computers and routers (771) such that the server can communicate with these directly over Ethernet without the help of a router. These nodes are known as neighbors of the server or on-link nodes. Other nodes are referred to as off-link nodes. From the perspective of node 1 (711) in FIG. 7, node 2 (721), node 3 (731) and the router (771) accessed via network interface 1 (773) are on-link nodes since they can be accessed directly over the Ethernet link (701). Nodes 4 (741), 5 (751) and 6 (761) are off-link nodes, as they can only be accessed through the router (771).

The server contains an Internet Protocol (IP) stack which allows it to communicate with both on-link (721, 731) and off-link nodes (741, 751, 761). At least one physical network interface (712) is assigned an IP address (713). When communicating with on-link nodes packets (120, 130) are sent directly over the Ethernet link (701) to the destination node. When communication with an off-link node packets are sent to an on-link router (771) which in turn forwards the packet to the final destination.

The server maintains a route-cache (1100) which contains entries (1110, 1120, 1130, 1140) used by the server to determine how to process an IP packet (120) that matches the particular entry (1110).

An entry (1110) in the route cache contains data relevant to identifying matching packets and instructions on how to process them. A packet is typically identified by a source IP address (121), a destination IP address (122), a pointer to a physical network interface (712). Accordingly a route cache entry will contain a source address (1111) and a destination address (1112). For packets coming from or destined for an off-link node, the entry will usually contain a router IP address used to identify the forwarding destination (1114). A cache-entry can however contain more detailed information for identification purposes and for processing purposes.

In some cases packets for different protocols should be processed differently, and accordingly there may be an entry per protocol. It is also possible to differentiate with respect to a Differentiated Services Code Point (DSCP). In one embodiment packets with a higher priority DSCP may be forwarded to one router, and packets with a lower priority DSCP to a second router.

A route cache entry often contains information about the state of a socket. As used herein, a "socket" can be the unique identification to or from which information is transmitted in the network. See, e.g., RFC 147. If the entry relates to communication over the Transmission Control Protocol (TCP) it may contain information about the connection state of the socket.

The source and destination IP addresses typically denote the IP addresses of the source and destination nodes of the IP packet. The pointer to the network interface identifies which network interface the entry relates to. The router IP address typically denotes the router which is responsible for handling traffic matching the entry.

In one embodiment of the invention, entries relating to traffic between the server and a neighbor will contain a source and a destination IP address. The entry used in relation to traffic from the server to the node will have the IP address of the server as the source IP address and the IP address of the node as the destination IP address. These addresses are swapped for the entry relating to traffic from the node to the server.

When the server needs to process a packet it may look for an entry in the route cache that matches relevant properties of the packet.

In one embodiment this lookup is performed by computing a hash value based upon at least the packet source address and the packet destination address. The hash value may also be based upon other properties including the protocol type, a service type, a differentiated services code point or any other packet property. The route-cache is then searched for an entry with a matching hash value.

In accordance with an embodiment of the invention, entries relating to traffic between the server and off-link nodes can be created with a source IP address or a destination IP address, but not both. In particular, the entry (1140) used in relation to traffic from off-link nodes to the server can contain a destination address identical to the IP address of the physical network interface, but not contain a valid source IP address. On the other hand, the entry (1130) used in relation to traffic going in the other direction (from the server to an off-link destination) can contain a source address identical to the IP address of the physical network interface, but not a valid destination IP address. A single entry (1140) can be used for traffic flowing from a number of different off-link nodes to the server, while another single entry (1130) can be used for traffic flowing from the server to a number of different off-link nodes.

This is possible because on many servers, all packets going from a particular physical network interface to off-link nodes can be treated similarly, and accordingly it is sufficient to use a single, common entry in the route cache to store information relating to how to handle these packets. Similarly it may be that packets from off-link nodes to particular physical network interface can be treated similarly. In one embodiment of the invention all entries relating to off-link packets are replaced by two shared entries, one for outgoing traffic and one for incoming traffic.

Depending on the structure of the route cache, the lack of a source or destination IP address may be indicated differently. In one embodiment this may be indicated by using the value 0 for the lacking IP address (0.0.0.0). In another embodiment, there may be a flag indicating the lack of such an address. In other words, the entry need not be tied to a particular off-link node, and a person skilled in the art will appreciate that this can be achieved in a number of ways encompassed by the present invention. The examples listed above are meant to be illustrative, and not exhaustive.

It is often not appropriate to treat all off-link traffic similarly. It may be that some traffic is of higher priority, and that it should therefore be directed to a separate router. In another embodiment, traffic relating to different protocols should be routed differently. A Domain Name System (DNS) server typically receives and responds to requests over the User Datagram Protocol (UDP) and it may be appropriate to process all traffic over this protocol using one router and all traffic over other protocols with a different router.

In an embodiment of the invention there can be therefore multiple shared route-cache entries relating to outgoing off-link traffic and multiple shared route-cache entries relating to incoming off-link traffic. Each of the outgoing entries can be used for a different protocol and accordingly contains different parameters for matching packets, and different parameters for processing packets. All the entries relating to outgoing traffic on a particular interface will match packets with the IP address of the physical interface as the source address, but will not contain a destination address. Each entry will match packets relating to different protocols.

There are many ways of specifying which packets match a particular shared entry. A person skilled in the art will appreciate that the invention is not limited to the parameters discussed above. Nor is it limited to using a fixed set of parameters that must match each packet precisely. It is possible to use more complicated rules including simple logical functions.

As when processing a packet received from an on-link node, when processing a packet from an off-link node, the server will look for an entry in the route cache matching the relevant properties of the respective packet.

In one embodiment this lookup is performed by computing a hash value based upon at least the packet source address and the packet destination address. As there will be no entry in the route cache matching the source address of the packet, when computing the hash value, the source address can be replaced with the address 0.0.0.0, and the route cache is then searched for an entry with a matching hash value. When the relevant entry does not contain the address 0.0.0.0 the hash can be based on a different or dynamic set of parameters or the search must be performed another way.

In one embodiment the server will detect that the packet is received from an off-link node and when searching the route-cache for a matching entry it will invoke special search procedures. For example, if a packet with a given set of parameters is processed during a period of low network congestion, the packet is matched to a first route cache entry. On the other hand, if the packet is processed during a period of high network congestion, then the packet can be matched to a second, different route cache entry. Any suitable external or other data (e.g., geolocation, time-of-day, the processing history of other packets, etc.) can be used to select a matching route cache entry.

The invention will protect the server against hackers sending requests from a large number of IP addresses or hackers sending requests with a large number of forged off-link IP addresses. As the server will still use normal caching methods for on-link addresses, it is still vulnerable to cache flooding when receiving a large number of requests from a large number of on-link addresses. The number of on-link IP addresses will be limited by the size of the subnet which the node is part of. When the invention is implemented at an end node, the number of entries an attacked can cause to be added to the route cache will be limited to a multiple of the size of the subnet. Typically twice the size of the subnet. A hacker can take advantage of this vulnerability by forging a large number of on-link addresses. To protect against such an attack, measures can be implemented to discard packets with forged on-link addresses before they cause entries to be created in the route-cache, in accordance with embodiments of the present invention.

In an embodiment of the invention, a router handling traffic processed by the shared entry can inspect each packet to verify that it does not contain a forged on-link IP address before it is forwarded to the server. In another embodiment functionality to perform such verification can be implemented on the server.

In one embodiment of the invention some packets received on the physical interface are not destined for the server itself but should be forwarded to another node. This is for instance the case when the invention is implemented on a router.

A router handling traffic between off-link nodes and on-link nodes can receive packets with a number of different destination IP addresses and a number of different source IP addresses. It may be appropriate to treat all of these packets or a subset of these packets similarly. A shared entry can then be used to match all or some these packets.

In one embodiment of the invention all the packets to be treated similarly do not share a source address or a destination address. Accordingly, the matching criteria for the shared entry cannot include checking whether a packet source or destination IP address matches a particular address.

In another embodiment of the invention, the entries in the route cache at the router contain the source or destination address of the next hop for the packet rather than the final destination. This makes it possible to match a route cache entry based on its source or destination address rather than other parameters.

In an embodiment of the invention, a router is connected to a first network link with at least one physical network interface. This Ethernet link may be connected to a number of nodes, including other routers and computers such that the router can communicate with these directly over Ethernet. The router is also connected to a second network link. The second network link may also be connected to a number of nodes, including other routers and computers. There may also be more than two network links. The network links may be Ethernet links, Frame Relay links, Token Ring links or other types of network links. The links need not be of the same type. The router may be able to address hosts at the OSI layer 2 over these links.

The router is able to receive IP packets from a first node over a first network link and forward the received packet to a second node over a second network link. The first and second network link may be the same link.

In one embodiment of the invention, the router is connected to a first network link which is an Ethernet link (known as the local link) and a Frame Relay link (known as the Internet link).

The router contains an Internet Protocol (IP) stack which allows it to communicate with both on-link and off-link nodes. At least one physical network interface is assigned an IP address. When sending and receiving packets to and from nodes that are on-link with respect to the local link, packets are sent directly over the Ethernet link to the destination node. When communicating with an off-link node, packets are sent to a node which on-link with respect to the internet link. This node may either be the final destination, or another router which will forward the packet towards the eventual destination.

The router maintains a route-cache which contains entries used by the router to determine how to process an IP packet that matches the particular entry.

A packet is typically identified by a source IP address, a destination IP address, a pointer to a source physical network interface and a pointer to a destination physical network interface.

In some cases, packets for different protocols should be processed differently, and accordingly there may be an entry per protocol. It is also possible to differentiate with respect to a DSCP. In one embodiment packets with a higher priority DSCP may be forwarded to one router, and packets with a lower priority DSCP to a second router. Packets of different DSCP may also be treated with different priority by the router. In one embodiment all packets with a particular DSCP are held back until no further packets of a higher priority DSCP are waiting to be forwarded.

In one embodiment, the router maintains information about the state of a socket between two network nodes. If a route-cache entry relates to communication over the Transmission Control Protocol (TCP), it may contain information about the connection state of the socket.

The source and destination IP addresses typically denote the IP addresses of the source and destination nodes of the IP packet. When the invention is implemented on the router, for many packets, none of these addresses will match an address assigned to a physical interface on the router. The pointer to the source and destination network interface identifies to which network interfaces the entry relates.

In one embodiment of the invention, entries relating to traffic between a node reachable on the internet link (the internet node) and a node reachable on the local link (the local node) will contain a source and a destination IP address. The entry used in relation to traffic from the internet to the node will have the IP address of the internet node as the source IP address and the IP address of the local node as the destination IP address. These addresses are swapped for the entry relating to traffic from the local node to the internet node.

When the router needs to process a packet it may look for an entry in the route cache that matches relevant properties of the packet.

In one embodiment this lookup is performed by computing a hash value based upon at least the packet source address and the packet destination address. The hash value may also be based upon other properties including the protocol type, a service type, a differentiated services code point or any other packet property. The route-cache is then searched for an entry with a matching hash value.

In accordance with an embodiment of the invention, entries relating to traffic between internet nodes and local nodes can be created with neither a source IP address nor a destination IP address. In particular, the entry used in relation to traffic from internet nodes to local nodes can contain no source IP address and no destination IP address, but be marked such that the entry is only used for traffic from the internet interface and with destination addresses within a particular range. On the other hand, the entry used in relation to traffic going in the other direction (from local nodes to internet nodes) can be marked such that the entry is only used for traffic from the local interface and with destination addresses within a particular range. It is also possible to use the forwarding address for a particular packet to decide what shared entry to use. A single entry can be used for traffic flowing from a number of different internet nodes to a number of different local nodes, while another single entry can be used for traffic flowing from a number of different local nodes to a number of different internet nodes.

This is possible because on many routers, all packets received on a particular physical network interface destined for an internet node can be treated similarly, and accordingly it is sufficient to use a single, common entry in the route cache to store information relating to how to handle these packets. In one embodiment of the invention all entries relating to internet packets are replaced by two shared entries, one for traffic destined for local nodes, originating from Internet nodes; and one for traffic destined for internet nodes, originating from local nodes.

Depending on the structure of the route cache, the lack of both a source and destination IP address may be indicated differently. In one embodiment this may be indicated by using the value 0 for the lacking IP address (0.0.0.0). In another embodiment, there may be a flag indicating the lack of such an address. In other words, the entry need not be tied to a particular off-link node, and a person skilled in the art will appreciate that this can be achieved in a number of ways encompassed by the present invention. The examples listed above are meant to be illustrative, and not exhaustive.

When the invention is implemented on a router there may be a need to use a more complicated method for packet matching than identifying that certain properties of a packet match certain predetermined values. There are many ways of specifying which packets match a particular shared entry. A person skilled in the art will appreciate that the invention is not limited to the parameters discussed above. In one embodiment external factors are used to determine what packets match an entry. For example matching can be determined based on the status of the network or the geographical location of an IP address.

An embodiment of the invention optimizes the route cache of a load-balancer. A load balancer can forward packets received to one of a number of processing nodes. The load balancer may use one or more shared entries for all traffic to or from a particular processing node.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims.

Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for sending a network-packet having a packet-source-address and a packet-destination-address, comprising:
    establishing a route-cache comprising entries containing at least an entry-source-address, an entry-destination-address, and an entry-reference to a network-interface;
    designating the network-interface with a front-interface;
    associating the network-interface with a front-interface-IP-address;
    creating an off-link destination-entry in the route-cache containing an entry-source-address identical to the front-interface IP-address, and a forwarding-address, wherein the off-link destination-entry does not include the packet-destination-address;
    determining if the packet destination-address is an off-link address;
    if the packet-destination-address is determined to be an off-link address, then finding in the route-cache the off-link destination-entry having the same source-address as the packet-source-address and having the forwarding-address, wherein finding in the route-cache the off-link source-entry comprises:
        calculating a search-hash-value based on at least the packet-source-address; and
        finding, in the route-cache, an entry containing a hash-value identical to the search-hash-value; and
    sending the packet to the forwarding-address via the front-interface.

2. The method of claim 1, wherein the off-link-destination-entry contains an entry-service-type-identifier and the network-packet contains a packet-service-type-identifier and finding in the route-cache the off-link source-entry further comprises:
    ensuring that the entry-service-type-identifier is identical to the packet-service-type-identifier.

3. The method of claim 1, wherein the off-link-destination-entry contains an entry-protocol-identifier and the network-packet contains a packet-protocol-identifier and finding in the route-cache the off-link source-entry further comprises:
    ensuring that the entry-protocol-identifier is identical to the packet-protocol-identifier.

4. The method of claim 1, wherein the off-link-destination-entry contains an entry-differentiated-services-code-point and the network-packet contains a packet-differentiated-services-code-point and finding in the route-cache the off-link source-entry further comprises:
    ensuring that the entry-differentiated-services-code-point is identical to the packet-differentiated-services-code-point.

5. The method of claim 1, wherein the network-packet originates from a socket which has an associated socket-connection state, and which is controlled by an operating system;
    determining that the socket-connection-state is not available in the route-cache; and
    requesting, from the operating system, the connection-state of the socket.

6. The method of claim 5, where the socket forms a TCP connection.

7. A method for receiving a network packet having a packet-source-address and a packet-destination-address, comprising:
    establishing a route-cache comprising entries containing at least an entry-source-address, an entry-destination-address, and an entry-reference to a physical network-interface;
    designating the physical network-interface as a front-interface;
    associating the physical network-interface with a front-interface IP-address;
    creating an off-link source entry in the route-cache containing an entry-destination-address identical to the front-interface IP-address, wherein the off-link source entry does not include the packet-source-address;
    determining if the packet-source-address is an off-link address;
    if the packet-source-address is determined to be an off-link address, then finding in the route-cache the off-link source entry having the same destination-address as the packet-destination-address; and
    forwarding the packet to a local socket.

8. The method of claim 7, wherein finding in the route-cache the off-link source-entry comprises:
    calculating a search-hash-value based on at least the packet-destination-address; and
    finding, in the route-cache, an entry containing a hash-value identical to the search-hash-value.

9. The method of claim 7, wherein the off-link-source-entry contains an entry-service-type-identifier and the network-packet contains a packet-service-type-identifier and finding in the route-cache the off-link source-entry further comprises:
    ensuring that the entry-service-type-identifier is identical to the packet-service-type-identifier.

10. The method of claim 7, wherein the off-link-source-entry contains an entry-protocol-identifier and the network-packet contains a packet-protocol-identifier and finding in the route-cache the off-link source-entry further comprises:
    ensuring that the entry-protocol-identifier is identical to the packet-protocol-identifier.

11. The method of claim 7, wherein the off-link-source-entry contains an entry-differentiated-services-code-point and the network-packet contains a packet-differentiated-services-code-point and finding in the route-cache the off-link source-entry further comprises:
    ensuring that the entry-differentiated-services-code-point is identical to the packet-differentiated-services-code-point.

12. The method of claim 7, wherein the network-packet originates from a socket which has an associated socket-connection state, and which is controlled by an operating system;
    determining that the socket-connection-state is not available in the route-cache; and
    requesting, from the operating system, the connection-state of the socket.

13. The method of claim 12, where the socket forms a TCP connection.

14. A method for forwarding a network packet having a packet-source-address and a packet-destination-address, comprising:
  establishing a route-cache comprising entries containing information about how to process a packet wherein at least one entry contains an entry-source-address, an entry-destination-address, and an entry reference to a physical network-interface;
  creating an off-link source entry in the route-cache, wherein the off-link entry does not include the packet-source-address and the off-link source entry does not contain the packet-destination-address;
  determining if the packet-source-address is an off-link address;
  if the packet-source-address is determined to be an off-link address, then finding in the route-cache the off-link source entry; and
  forwarding the packet to the packet-destination-address.

15. The method of claim 14, wherein creating an off-link source entry in the route-cache further comprises marking the entry such that it is only used for packets where the packet-destination-address is an on-link address; and
  wherein finding in the route-cache the off-link source entry comprises determining that the packet-destination-address is an on-link address.

16. The method of claim 14, wherein the off-link-source-entry contains an entry-service-type-identifier and the network-packet contains a packet-service-type-identifier and finding in the route-cache the off-link source-entry further comprises:
  ensuring that the entry-service-type-identifier is identical to the packet-service-type-identifier.

17. The method of claim 14, wherein the off-link-source-entry contains an entry-protocol-identifier and the network-packet contains a packet-protocol-identifier and finding in the route-cache the off-link source-entry further comprises:
  ensuring that the entry-protocol-identifier is identical to the packet-protocol-identifier.

18. The method of claim 14, wherein the off-link-source-entry contains an entry-differentiated-services-code-point and the network-packet contains a packet-differentiated-services-code-point and finding in the route-cache the off-link source-entry further comprises:
  ensuring that the entry-differentiated-services-code-point is identical to the packet-differentiated-services-code-point.

19. The method of claim 14, wherein the network-packet originates from a socket which has an associated socket-connection state, and which is controlled by an operating system;
  determining that the socket-connection-state is not available in the route-cache; and
  requesting, from the operating system, the connection-state of the socket.

20. The method of claim 19, where the socket forms a TCP connection.

21. A method for forwarding a network packet having a packet-source-address and a packet-destination-address, comprising:
  establishing a route-cache comprising entries containing information about how to process a packet wherein at least one entry contains an entry-source-address, an entry-destination-address, and an entry reference to a physical network-interface;
  creating an off-link destination entry in the route-cache, wherein the off-link entry does not include the packet-source-address and the off-link destination entry does not contain the packet-destination-address, wherein creating an off-link destination entry in the route-cache further comprises marking the entry such that it is only used for packets where the packet source address is an on-link address;
  determining if the packet-destination-address is an off-link address;
  if the packet-destination-address is determined to be an off-link address, then finding in the route-cache the off-link destination entry, wherein finding in the route-cache the off-link destination entry comprises verifying that the packet source address is an on-link address; and
  forwarding the packet to the packet-destination-address.

22. The method of claim 21, wherein the off-link-destination-entry contains an entry-service-type-identifier and the network-packet contains a packet-service-type-identifier and finding in the route-cache the off-link source-entry further comprises:
  ensuring that the entry-service-type-identifier is identical to the packet-service-type-identifier.

23. The method of claim 21, wherein the off-link-destination-entry contains an entry-protocol-identifier and the network-packet contains a packet-protocol-identifier and finding in the route-cache the off-link source-entry further comprises:
  ensuring that the entry-protocol-identifier is identical to the packet-protocol-identifier.

24. The method of claim 21, wherein the off-link-destination-entry contains an entry-differentiated-services-code-point and the network-packet contains a packet-differentiated-services-code-point and finding in the route-cache the off-link source-entry further comprises:
  ensuring that the entry-differentiated-services-code-point is identical to the packet-differentiated-services-code-point.

25. The method of claim 21, wherein the network-packet originates from a socket which has an associated socket-connection state, and which is controlled by an operating system;
  determining that the socket-connection-state is not available in the route-cache; and
  requesting, from the operating system, the connection-state of the socket.

26. The method of claim 25, where the socket forms a TCP connection.

27. A method for forwarding a network-packet having a packet-source-address and a packet-destination-address using a route-cache having entries containing at least an entry-source-address, an entry-destination-address, an entry-reference to a source physical network-interface and an entry-reference to a destination physical network-interface, comprising:
  creating a first shared entry in the route-cache containing an entry-reference to a source physical network-interface and data to determine whether a destination IP address matched the entry, wherein the first shared entry does not include a packet-destination-address and does not include a packet-source-address;
  receiving a packet containing a destination IP address on a physical network interface; and
  finding in the route-cache an entry containing an entry-reference to the source physical network-interface on which the packet was received and containing data indicating that the packet destination IP address matches the entry.

* * * * *